United States Patent [19]

Janssen et al.

[11] Patent Number: 4,642,246

[45] Date of Patent: Feb. 10, 1987

[54] PROCESS FOR CHEMICALLY BONDING A LUBRICANT TO A MAGNETIC DISK

[75] Inventors: Robert A. Janssen, Alpharetta, Ga.; Gary D. Sorenson, Eden Prairie, Minn.

[73] Assignee: Magnetic Peripherals, Inc., Minneapolis, Minn.

[21] Appl. No.: 796,811

[22] Filed: Nov. 12, 1985

[51] Int. Cl.$^4$ .............................................. B05D 5/12
[52] U.S. Cl. .................................... 427/127; 427/128; 427/130; 427/131; 427/333
[58] Field of Search ............................. 427/127–132, 427/48

Primary Examiner—Bernard D. Pianalto
Attorney, Agent, or Firm—J. A. Genovese; E. P. Heller, III

[57] ABSTRACT

A process for chemically bonding a lubricant to a magnetic disk by applying a functionalized polymeric lubricant to the disk, heating it until a significant portion bonds to the disk via the functional terminal group, and then reacting the unbonded residue with a chemical moiety, the residue then forming a mobile lubricant highly resistant to spin-off due to the presence of the bonded lubricant.

7 Claims, No Drawings

PROCESS FOR CHEMICALLY BONDING A LUBRICANT TO A MAGNETIC DISK

BACKGROUND OF THE INVENTION

1. Field of the Invention

The inventions pertains to processes for lubricating magnetic disks and more particularly to process for bonding the lubricant to the disk.

2. Brief Description of the Prior Art

Lubricants applied, but not bonded, to magnetic disks are subject to removal either by use of cleaning chemicals or by spin-off. Pedrotty U.S. Pat. No. 4,268,556 proposes a series of highly polar lubricants resistant to solvents. All are resistant to solvents, but some are poor lubricants. Afzali-Ardakani et al. U.S. Pat. No. 4,446,193 proposes a diazo compound applied to a disk. This is then heated to form a carbene intermediate which bonds to the polymeic coatings or metal oxides of most magnetic disks. However, diazo compounds are toxic and highly unstable rendering both the manufacturing process and resulting disk product potentially unsafe.

DESCRIPTION OF THE INVENTION

The invention comprises applying a functionalized terminated polymeric lubricant to a magnetic disk, heating it so that the functional group covalently bonds to the surface polymers and/or metal oxides of the magnetic disk, and then either removing the unreacted lubricant residue with a solvent or solvents and replacing it with a conventional non functionalized lubricant or reacting the residue with a chemical moiety to render the functional group inert.

In one form of the invention, the functionalized lubricant is a perfluorinated polyether having at least one terminal carboxyl group. One example of the chemical moiety to react with this functional group is an aziridine containing compound. A preferred compound contains there aziridine groups which reacts with three carboxyl groups to form a large polymer of higher molecular weight having exceptionally low surface friction and no detectable spin-off.

The inventors have determined that mere application of a carboxyl terminated lubricant, via Pedrotty examples 9 and 13, results in a lubricant having extremely poor surface friction properties and not significantly better surface retention characteristics. However, heating such a lubricant above 150 degrees F. for six or more hours dramatically increases the surface retention of the lubricants. Also the amount of lubricant removable from the disk by solvents dramatically decreases, indicating an increase in the amount of lubricant bonded to the polymeric coatings and metal oxides of the magnetic disks. However, unless the residue is removed, the remaining carboxyl terminated polymers cause high surface friction.

A disk having only a covalently bonded lubricant may exhibit good frictional and retention properties, but wear characteristics can be expected to be poor in that the lubricant, once worn from a location, is not replaced as with more mobile lubricants. The inventors solve this problem by the addition of a conventional, non functionalized lubricant to the surface having the bonded lubricant or reacting the unbonded residue with a chemically moiety. The non functionalized lubricant increses wear resistance and at the same time does not spin-off to a significant degree. The reacted unbound lubricant exhibited no spin-off whatsoever. The inventors speculate that the cause of this increase in resistance to spin-off is the uncoiling of the bonded lubricant polymer under heat to form a tree-like structure between which the non functionalized lubricant or the inert functionalized lubricant must flow. The tree-like structure is confirmed by the increased thickness of the bonded coating under the influence of heat.

In the following examples, lubricant spin-off was determined by rotating the lubed disk at 3600 rpms, providing silicon targets at periphery of the disk, and periodically analyzing the targets for the quantity of fluorine they contain, which is proportional to the quantity of fluorinated lubricant spun off. Surface friction was determined by the magnitude of force necessary to break free a 30 g weighted head. Sliding friction was the force on the head at 200 ips. Wear was determined by a count of 1000 particles in 6 minutes, which is indicative of catastropic failure. Thickness was determined by ESCA.

PRIOR ART EXAMPLE 1

This first example is of a non functionalized lubricant conventionally used to lubricate a magnetic disk. The tests results provide a basis for comparison to the results of the following examples.

A rigid magnetic disk having magnetizable iron and aluminum oxide particles and a phenolic-phenoxy polymeric binder was lubricated by spraying a 2% by weight solution of a perfluorinated polyether lubricant Krytox 143 AC (available from Dupont) and 1,1,2 trichloro-trifluoro-methane (Freon 113). The general formula for Krytox 143 Ac is $$CF_3-[C_2F_3CF_3O]_m-[CF_2CF_2O]_n-CF_3$$

where m and n are varied to provide for varying viscosities. In this example the average molecular weight was 6,200 and the viscosity was 270 centistokes at 100 degrees F. After application, the lube thickness was 70 angstroms and the total lube weight on the disk was 2.5 mg.

The above-described tests were then performed on the disk and the following results obtained:

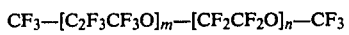

| | | |
|---|---|---|
| static friction | = | 3.9 grams |
| sliding friction | = | 2.3 grams |
| lube spin-off rate | = | 6.3% per 30 days |
| wear time to failure | = | 8.3 hours |

EXAMPLE 1

The next example uses a functionalized lubricant according to the present invention, but without the process steps. The lubricant is merely applied to the disk as in the preceding example. The lubricant chosen has an identical formula to the preceding Krytox 143 AC except that a terminating $CF_3$ group is replaced with a carboxyl group COOH. This lubricant is available as Krytox 157M from Dupont. M stands for medium molecular weight. The average molecular weight was 4,500 and the viscosity of the example was 280 centistrokes at 100 degrees F. A 2% solution with Freon, as in the Prior Art Example, was applied to the same type of disk by spraying and hand buffing. The tests were then performed with the following results:

|   |   |
|---|---|
| static friction | = 20.4 grams |
| sliding friction | = 7.6 grams |
| lube spin-off rate | = 5.9% per 30 days |
| wear time to failure | = 3.2 hours |

These results show that the carboxyl terminated lubricant exhibits poor frictional and wear characteristics while the retention time is not significantly improved.

EXAMPLE 2

The same as Example 1 except that the disk was first heated at 250 degrees F. for 24 hours.

|   |   |
|---|---|
| static friction | = 18.4 grams |
| sliding friction | = 7.0 grams |
| lube spin-off rate | = 0.8% per 30 days |
| wear time to failure | = 4.6 hours |

These results show a significant reduction in lube spin-off.

EXAMPLE 3

The same as Example 2 except that the disk was subsequently exposed to Freon 113, 1,1,2 Trichloro-trifluoro-ethane. This removed all unbonded lubricant. The total weight of lubricant removed was 6.2 mg. Krytox 143 AC was then applied as in Prior Art Example 1 however using a 2 percent solution in Freon 113, 1,1,2 trichloro-trifluoro-ethane. The disk absorbed 6.0 mg of the lubricant, about two and one-half times the amount adsorbed by the disk of Prior Art Example 1. The tests were performed:

|   |   |
|---|---|
| static friction | = 3.5 grams |
| sliding friction | = 2.5 grams |
| lube spin-off rate | = 1.0% per 30 days |
| wear time to failure | = 12.3 hours |

Static and sliding friction are similar to Prior Art Example 1, but the lube spin-off rate is six times better and wear time one and a half times better. The bonded lubricant contributes to the increased surface retention.

EXAMPLE 4

The same as Example 2 (functionalized lube applied and heated) except that the disk used did not have the metal oxide particles. After heat treatment, the disk was exposed to Freon 113 vapors and 2.5 mg of the lubricant was removed, vs 6.2 mg of the preceding example. ESCA analysis showed virtually no remaining lubricant indicating virtually none of the functionalized lubricant polymers bonded to the binder. This indicates that the bonding is to the metal oxide particle, most probably to the oxygen of the oxides. That is

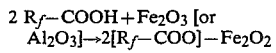

The inventors except that the functionalized lubricant, when heated, will also bond to organic binders having hydroxyl or polar groups.

EXAMPLE 5

The same as Example 2 except that the heat treated lubricant was then oversprayed with a 1% solution by weight of R—[N—[CH$_2$]$_2$]$_3$, a 3 aziridine containing molecule in Freon 113. In the example, the aziridine molecule is trimethylolpropane-tris-[B—[-N—aziridinyl]propionate]. The chemical is available from Cordova Chemical Company under the trademark XAMA-2. In the example, the molecular weight of the compound was 425 and the viscosity was 125 centistrokes at 72 degrees F. The carbon atoms of the aziridine react with the terminal carboxyl groups of three of the unbonded lubricant polymers to form a unified molecule having a central R surrounded by three branches of the aziridine-functionalized lubricant combination. The disk was allowed to stand several minutes at room temperature prior to testing.

|   |   |
|---|---|
| static friction | = 2.0 grams |
| sliding friction | = 1.8 grams |
| lube spin-off rate | = 0% per 30 days |
| wear time to failure | = greater than 24 hours |

These results show significant reductions in friction and no observable spin-off. Also the wear time for the disk has been dramatically improved over the previous examples.

As mentioned above, the inventors expect that the chemical moiety reacted with the carboxyl end of the unbound functionalized lubricant could also be an aziridine containing compound with fewer than three aziridine groups. Also expected to work is an epoxide containing molecule, e.g., H$_2$COCH—R where R is an alkyl. The epoxide reacts with the carboxyl terminal group of the functionalized lubricant to for the following product:

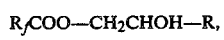

where R$_f$ is the perfluorinated polyether lubricant and R is an alkyl group. However, a multi epoxy containing molecule can also be utilized.

In the above examples, the lubricated disk was heated for 24 hours at 250 degrees F. Subsequent testing has determined that sufficient functionalized lubricant retention is obtained when the disk is heated from 150 degrees to 300 degrees between six to ten hours. Temperature above 300 degrees may reduce the time factor accordingly.

We claim:

1. A process for lubricating a magnetic disk characterized by contacting the disk with a functionalized lubricant, heating the lubricant for a time sufficient for the functional terminal group of a sufficient portion of the lubricant to covalently bond to the surface of the disk, and reacting the residual unbonded lubricant with either an aziridine or epoxide containing molecule.

2. The process according to claim 1 wherein the functionalized lubricant is a perfluorinated polyether having at least one terminal carboxyl group.

3. The process according to claim 2 wherein the aziridine containing molecule contains three aziridine groups.

4. The process according to claim 1 wherein the axiridine containing molecule contains three airidine groups.

5. The process for lubricating a magnetic disk characterized by contacting the disk with a functionalized lubricant having at least one functional terminal carboxyl group, heating the lubricant for a time sufficient for the functional terminal group to covalently bond to the surface of the disk, removing the unbonded lubricant with a solvent, and contacting the disk with a non functionalized lubricant.

6. The process according claim 9 wherein the functionalized lubricant is a perfluorinated polyether having one terminal carboxyl group.

7. The process according to claim 9 wherein the non functionalized lubricant is a perfluorinated polyether.

* * * * *

UNITED STATES PATENT AND TRADEMARK OFFICE
CERTIFICATE OF CORRECTION

PATENT NO. : 4,642,246
DATED : 2-10-87
INVENTOR(S) : Robert A. Janssen
Gary D. Sorenson It is certified that error appears in the above—identified patent and that said Letters Patent is hereby corrected as shown below:

Change the first word of claim 5 to "A".

The dependency of claims 6 and 7 is to claim 5.

Signed and Sealed this

Eleventh Day of August, 1987

*Attest:*

DONALD J. QUIGG

*Attesting Officer*     *Commissioner of Patents and Trademarks*